United States Patent [19]

McLernon

[11] 3,755,743

[45] Aug. 28, 1973

[54] SIGNAL RECEIVER WITH A PLURALITY OF TUNERS AND AUTOMATIC SWITCHING SYSTEM FOR CYCLICALLY ENERGIZING THE SAME

[75] Inventor: Michael W. McLernon, Kitchener, Ontario, Canada

[73] Assignee: Electrohome Limited, Ontario, Canada

[22] Filed: Apr. 10, 1972

[21] Appl. No.: 242,435

[52] U.S. Cl. .................. 325/462, 325/458, 325/459, 325/460, 325/462, 325/468, 325/471, 325/315, 325/316, 334/18, 334/20, 334/24, 334/8, 334/9, 334/10, 334/15, 334/87

[51] Int. Cl. .............................................. H04b 1/06

[58] Field of Search ............ 325/389–393, 458–463, 325/471, 468, 302, 307, 315, 316, 318, 461, 465; 334/8–10, 14, 15, 18–21, 24, 25, 87, 1, 22

[56] References Cited

UNITED STATES PATENTS 3,624,509 11/1971 Morici ................................ 325/458

*Primary Examiner*—Albert J. Mayer
*Attorney*—Peter W. McBurney et al.

[57] ABSTRACT

A signal receiver such as a television receiver has first and second tuners such as a VHF tuner and a UHF tuner. The tuners are capable of being simultaneously rendered into a number of different tuned conditions in each of which, when the tuners are energized, they will be tuned to signal within their respective frequency bands. When one of the tuners is rendered into a particular condition that preferably is different from the aforesaid tuned condition, the tuners are automatically alternately energized cyclically for predetermined periods of time to render the one of the tuners so energized capable of translating signals received by the receiver and within the frequency band of the respective tuner when that tuner is rendered into a tuned condition. Means are provided responsive to one of the tuners being rendered into a tuned state while energized for maintaining the energized tuner in its energized condition while the receiver is on until the aforesaid one tuner is rendered into the aforesaid particular condition.

15 Claims, 4 Drawing Figures

PATENTED AUG 28 1973 3,755,743

SHEET 1 OF 2

SIGNAL RECEIVER WITH A PLURALITY OF TUNERS AND AUTOMATIC SWITCHING SYSTEM FOR CYCLICALLY ENERGIZING THE SAME

BACKGROUND OF THE INVENTION

This invention relates to signal receivers of a type that have at least two tuners for translating signals in two different frequency bands. More particularly, this invention relates to television receivers having VHF and UHF tuners. Even more particularly, this invention relates to such a television receiver provided with means for automatically alternately energizing the UHF and VHF tuners cyclically for predetermined periods of time. Still more particularly, this invention relates to television receivers of the aforesaid type that are remotely controlled.

For many years television receivers were provided with only one tuner, namely, a VHF tuner. Many different types of remote control systems were designed for use with television receivers of this type. For many years, VHF tuners have been of the rotary channel-selector type having a rotary turret (so-called turret tuners), and remote control systems for VHF tuners of this type generally have included a motor connected to the drive shaft of the turret, a motor control circuit, a remote control receiver and a remote control transmitter. Many different types of remote control transmitters and receivers have been employed. Thus, in the wireless area, sonic and electromagnetic devices have been employed. In the non-wireless area the transmitter may be a pushbutton connected via conductors to the remote control receiver. The remote control receiver receives signals from the transmitter and causes the motor control circuit to operate the motor in a stepwise fashion to rotate the VHF tuner to a position in which it is tuned to the desired channel. Other remote control arrangements have been provided to permit the receiver to be turned on and off remotely and to permit the volume to be adjusted remotely.

Most receivers now being manufactured are provided with both UHF and VHF tuners. In cases where these tuners both are turret type tuners it is possible to remotely control both of them in the same way as VHF tuners previously have been remotely controlled. In other words, separate drive motors can be provided for each tuner and these motors remotely controlled. However, systems of this type involve considerable duplication of components and thus are relatively expensive. In addition, if it is going to be possible to switch quickly and conveniently from a VHF channel to a UHF channel, it is necessary to provide in the remote control system some means for remotely controlling which of the two tuners will be energized. This increases the expense of the remote control system.

The same basic problem exists in a television receiver in which one of tuners is of the varactor diode type, the other tuner being, say, of the turret type. In such a receiver it is known to couple a control voltage source to the drive shaft of the turret of the turret type tuner, this source being adapted to feed different tuning voltages to, say, the UHF tuner in response to rotation of the drive shaft. The motor connected to this drive shaft can be remotely controlled by a conventional remote control system, but, again, it is necessary to provide in the remote control system an extra function to permit remote control of the switch of the receiver that determines whether the UHF or the VHF tuner is energized.

SUMMARY OF THE INVENTION

In accordance with this invention there is provided in combination with a signal receiver having first and second tuners for translating signals in first and second different frequency bands respectively, means that are responsive to one of the tuners being in a certain condition to which that tuner may be rendered for automatically alternately energizing the two tuners cyclically for predetermined periods of time to render the one of the tuners, when tuned, that is so energized capable of translating signals received by the receiver and within the frequency band of that tuner and responsive to one of the tuners being rendered to a tuned operating condition while energized for maintaining the energized tuner in its energized state while the receiver is on until the first mentioned tuner is rendered into its aforesaid condition. Such a signal receiver is particularly well suited to be remote controlled because the remote control system does not require any components to remotely operate the switch of the receiver that determines which of the two tuners will be energized.

BRIEF DESCRIPTION OF THE DRAWINGS

This invention will become more apparent from the following detailed description, taken in conjunction with the drawings, in which.

DESCRIPTION OF PREFERRED EMBODIMENTS

Figure 1:
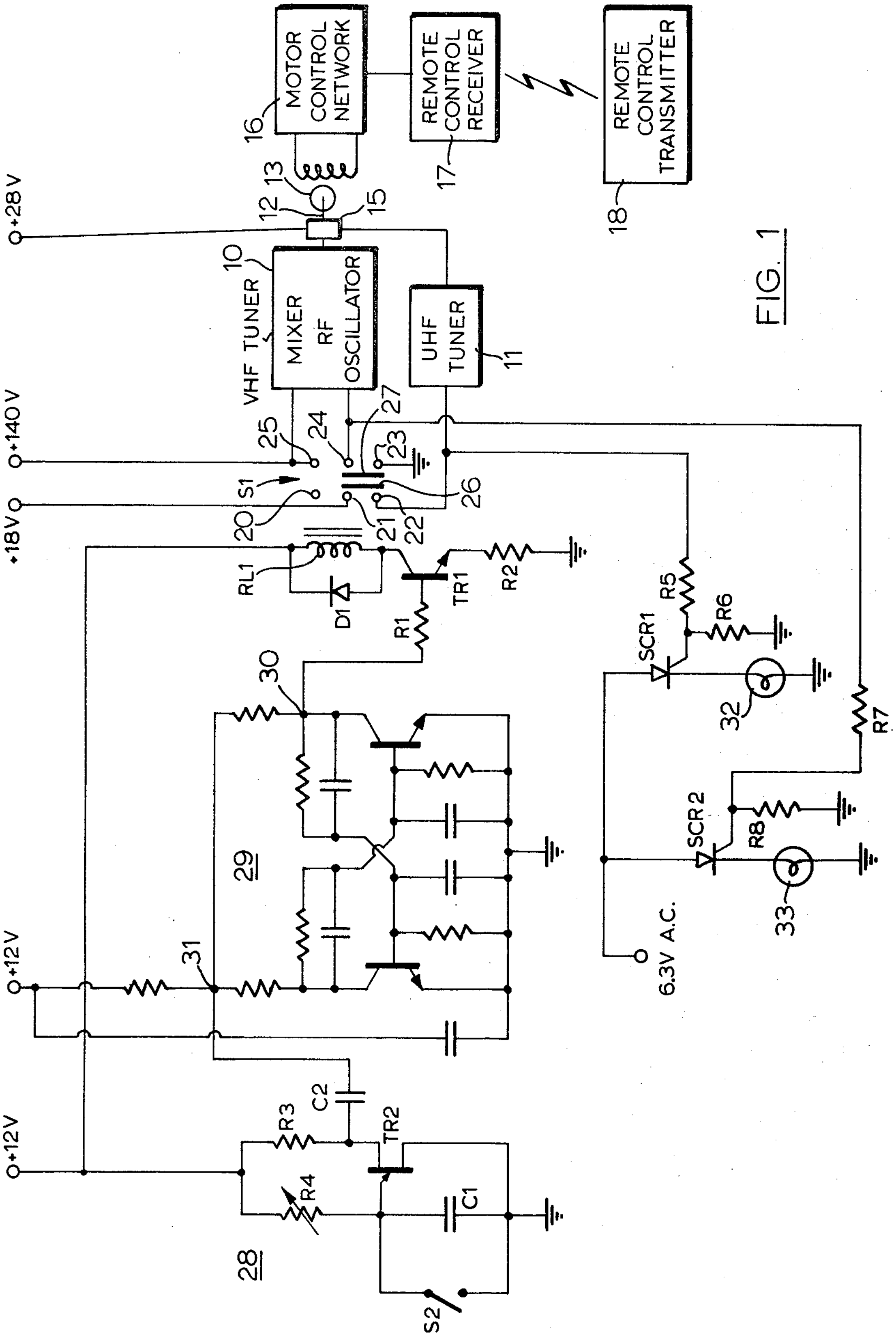
FIG. 1 is a partly schematic and partly block diagram of a part of a television receiver embodying this invention.

Referring to FIG. 1, there is shown the VHF and UHF tuners 10 and 11 respectively of a television receiver. These tuners are entirely conventional in nature, and VHF tuner 10 may be considered to be of the turret type, while UHF tuner 11 may be considered to be of the varactor diode type. The drive shaft 12 of the turret of turret tuner 10 is driven by a motor 13 that also drives the rotary contact 14 (FIG. 2) of a control voltage source 15. The operation of motor 13 is controlled by a conventional motor control network 16 that receives command signals from a conventional remote control receiver 17, these signals being transmitted by a remote control transmitter 18 and being signals that command a change in the tuning of the receiver. It will be understood that remote control transmitter 18 also can transmit signals to turn the receiver on or off and to change the volume level of the sound being reproduced by the receiver. However, these are conventional functions of a conventional remote control system and form no part of the instant invention. It also should be understood that the remote control system may be of many different types without departing from the preferred embodiment of this invention. It may be of the sonic type, for example, or it may be of the electromagnetic type. It also could be a wired system as opposed to a wireless system.

Figure 2:
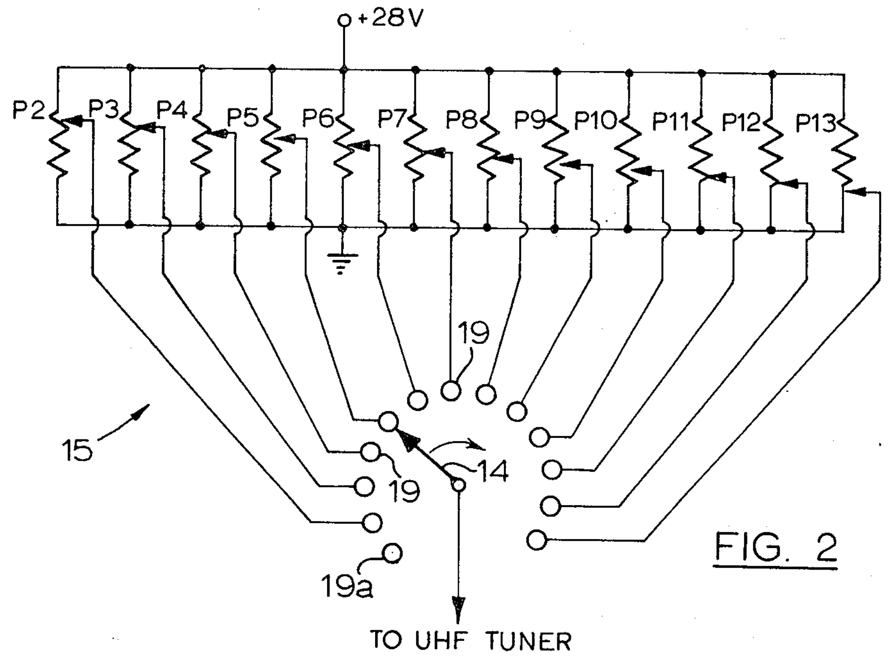
FIG. 2 is a circuit diagram of one of the components of FIG. 1.

One embodiment of control voltage source 15 is shown in FIG. 2 and includes a number of parallel connected potentiometers P2 and P13 inclusive being in number one less than the number of indented channel positions to which the turret of turret tuner 10 can be rotated, the latter corresponding to channels 1 to 13 inclusive. Potentiometers P2 to P13 all are of the same resistance value and are connected in parallel with each other between ground and a terminal at a positive DC potential, say, +28 volts. The sliders of potentiometers P2 to P13 may be preset at different locations and so deliver different tuning voltages to 12 different fixed terminals 19 of a rotary switch having rotary contact 14 driven by motor 13 from drive shaft 12 and one additional fixed terminal 19*a*. As shown in FIG. 2, rotary contact 14 is connected to UHF tuner 11 and supplies tuning voltages thereto, these tuning voltages differing depending upon which one of fixed terminals 19 is engaged by rotary contact 14. These tuning voltages of different magnitudes are supplied to the various varactor diodes of UHF tuner 11, and, in a well known manner, render the tuner into a condition where, upon being energized, it is tuned to a signal within the frequency band of the UHF tuner. It will be seen from FIG. 1 that simultaneously turret tuner 10 will be rendered into a condition where, upon being energized, it will be tuned to a signal within the frequency band of the VHF tuner. In other words, assuming both tuners to be de-energized and VHF tuner 10 to be tuned to, say, channel 6 VHF tuner 10 may be moved to, say, the channel 7 position by operation of motor 13, so that when VHF tuner 10 is energized, it will be tuned to channel 7. At the same time rotary contact 14 will move from engaging terminal 19 connected to potentiometer P6 to engagement with terminal 19 connected to potentiometer P7, so that when UHF tuner 11 is energized, it will be tuned to a frequency that is directly related to the magnitude of the DC voltage at the slider of potentiometer P7 and which may be different frequency than that to which it was tuned previously. In this respect, it is to be understood that the arrangement of FIG. 2 may be such that the whole UHF spectrum may be covered by varying the slider of any one of potentiometers P2 – P13 from "top" to "bottom". Alternatively, the arrangement may be such that, for example, some restriction on the degree of movement of each slider may be imposed, so that each "pot" can tune in only several UHF channels, and the bandwidths for each "pot" are selected so that the whole UHF spectrum is covered. Thus potentiometer P7 might be variable to the extent of being capable of tuning in UHF channels 45 – 50, while potentiometer P6 can tune in channels 39 – 44 and potentiometer P8 channels 51 – 56. On the other hand, the arrangement of FIG. 2 may be a combination of the two foregoing arrangements.

Within the television receiver there is a switch S1 that determines whether the VHF tuner or the UHF tuner is energized. The term "energized" as used herein and in the claims refers to a tuner being powered so as, when tuned, to be capable of translating signals to which it is tuned. Switch S1 actually is constituted by the contacts of a relay having a coil RL1. These contacts consist of fixed contacts 20 to 25 inclusive and moveable contacts 26 and 27. Fixed contact 20 is disconnected. Fixed contact 21 is connected to a source of suitable DC potential, say, +18 volts. Fixed contact 22 is connected to UHF tuner 11 and supplies power thereto when moveable contact 26 bridges fixed contacts 21 and 22. Fixed contact 23 is grounded. Fixed contact 24 is connected to the RF oscillator of VHF tuner 10, while fixed contact 25 is connected to the mixer of VHF tuner 10. The mixer of VHF tuner 10 is permanently connected to a source of suitable DC potential, say, +140 volts, while the same source of DC potential is connected to the RF oscillator of VHF tuner 10 only when moveable contact 27 bridges fixed contacts 24 and 25. It is in no way essential to the invention that the mixer of VHF tuner 10 be permanently energized. In this particular embodiment of the invention, even when VHF tuner 10 is not energized, the mixer thereof remains powered and is used as an amplifier for the IF output signal of UHF tuner 11.

Moveable contacts 26 and 27 move simultaneously. In one position thereof moveable contact 26 bridges fixed contacts 20 and 21 and moveable contact 27 bridges fixed contacts 24 and 25. When the moveable contacts are in this position, UHF tuner 11 is de-energized and VHF tuner 10 is energized. In the other position thereof moveable contact 26 bridges fixed contacts 21 and 22 and moveable contact 27 bridges fixed contacts 23 and 24. In this case UHF tuner 11 is energized and VHF tuner 10 is de-energized. For the sake of simplicity the two positions that may be assumed by moveable contacts 26 and 27 will be referred to as the upper and lower positions, the VHF tuner being energized in the upper position and the UHF tuner being energized in the lower position.

In accordance with the instant invention means are provided, when VHF tuner 10 is in a certain condition, for automatically alternately energizing the two tuners cyclically for predetermined periods of time to render the one of the tuners so energized capable of translating signals received by the receiver and within the frequency band of that tuner when the tuner is tuned. One such means is shown in FIG. 1 and now will be described, but it will be apparent to those skilled in the art that numerous other means may be employed to achieve this result. However, referring to FIG. 1, there is shown a trigger pulse producing network 28 that produces trigger pulses for a conventional bistable multivibrator 29. Both networks 28 and 29 are conventional networks, and one of the output terminals 30 of bistable multivibrator 29 is connected via a resistor R1 to the base electrode of a transistor TR1 that functions as a switch. The emitter electrode of transistor TR1 is connected via a resistor R2 to a terminal at ground potential. Relay coil RL1 is shunted by a protective diode D1 and is connected between the collector electrode of transistor TR1 and a terminal at a suitable positive Dc potential, say, +12 volts.

Trigger pulse producing network 28 includes a unijunction transistor TR2. One of the bases of this transistor is grounded, while the other base is connected via a resistor R3 to a terminal at a suitable positive DC potential, say, +12 volts. Connected between this same terminal and the emitter of transistor TR2 is a variable resistor R4. A capacitor C1 is connected between the emitter electrode of unijunction transistor TR2 and ground, and this transistor is shunted by a switch S2, the operation of which is controlled by drive shaft 12. The output pulse of trigger network 28 is coupled to the input terminal 31 of bistable multivibrator 29 via a coupling capacitor C2.

VHF tuner 10 may have, for example, thirteen detented positions corresponding to each of channels 1 to 13 inclusive. When the rotary turret of tuner 10 is in ergize the VHF and UHF tuners takes place, and this is visually displayed to the viewer. If the viewer wishes to tune to a UHF channel, he waits until the UHF tuner is energized and then transmits a signal to remote control receiver 17 causing rotary contact 14 to advance to the desired UHF channel. At the same time the turret of VHF tuner 10 will advance, but a UHF signal will be displayed rather than a VHF signal because, at the time of advancement, the UHF tuner was energized. On the other hand, if, at the time of advancement the VHF tuner had been energized, a VHF signal would be displayed upon advancement of VHF tuner 10. The need for a function in the remote control system to remotely control which of the tuners is energized is completely eliminated.

Figure 3:
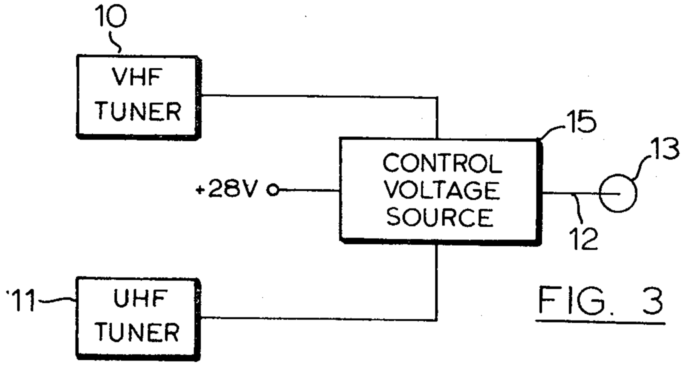
FIG. 3 illustrates a modification of the invention shown in FIG. 1.

The embodiment of the invention shown in FIG. 3 is the same as the embodiment shown in FIG. 1 except that VHF tuner 10 is of the varactor diode type rather than of the turret tuner type, so it also is supplied with tuning voltages from control voltage source 15.

Figure 4:
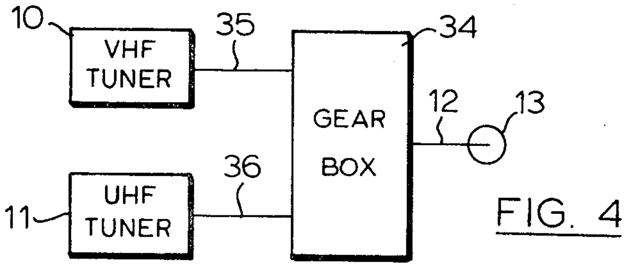
FIG. 4 shows another embodiment of the invention that is illustrated in FIG. 1.

The embodiment of the invention shown in FIG. 4 is one in which both the VHF tuner and the UHF tuner are of the turret tuner type and are driven by motor 13 via shaft 12 and the output shafts 35 and 36 of a gear box 34 for which shaft 12 constitutes the input drive shaft.

As stated beforehand, other networks or devices may be used to effect the automatic switching hereinbefore described. Thus, special latching relays could be employed, for example.

While preferred embodiments of this invention have been described herein, those skilled in the art will appreciate that changes and modifications may be made therein without departing from the spirit and scope of this invention as defined in the appended claims.

What I claim as my invention is:

1. In a signal receiver of a type having first and second tuners for translating signals in first and second different frequency bands respectively and means for simultaneously rendering said first and second tuners into any one of a plurality of different conditions in each of which, upon being energized, said first and second tuners are tuned to and are adapted to translate signals received by said receiver within said first and second frequency bands respectively; the improvement comprising means responsive to said first tuner being in a predetermined condition to which said first tuner is adapted to be rendered by said rendering means for automatically, alternately energizing said first and second tuners cyclically each for predetermined periods of time to render the one of said tuners so energized capable of translating signals received by said receiver within said frequency band of said one tuner when said one tuner is rendered into any one of said plurality of different conditions and responsive to said one tuner being rendered into any one of said plurality of different conditions while so energized for maintaining said one tuner energized while said receiver is turned on until said first tuner is rendered into said predetermined condition.

2. The invention according to claim 1 wherein said rendering means include a motor.

3. The invention according to claim 2 wherein said rendering means include a remote control system for controlling the operation of said motor.

4. The invention according to claim 1 wherein said signal receiver is a television receiver and said tuners are VHF and UHF tuners.

5. The invention according to claim 3 wherein said signal receiver is a television receiver and said tuners are VHF and UHF tuners.

6. The invention according to claim 5 wherein one of said tuners is a varactor tuner and the other of said tuners is a tuner of a type having a rotor tuning device, said rendering means including a source of tuning voltages for said varactor tuner, switching means connected between said source and said varactor tuner for supplying different ones of said tuning voltages to said varactor tuner, and means drivingly connecting said motor and both of said rotary tuning device and said switching means.

7. The invention according to claim 6 wherein said other tuner is a turret tuner having a rotary turret and said rotary tuning device is said rotary turret.

8. The invention according to claim 5 wherein each of said tuners is of a type having a rotary tuning device, said rendering means including means drivingly connecting said motor and both of said rotary tuning devices.

9. The invention according to claim 5 wherein each of said tuners is a varactor tuner, said rendering means including at least one source of tuning voltages for said varactor tuners, switching means connected between each said source and said varactor tuners for supplying different ones of said tuning voltages to said varactor tuners, and means drivingly connecting said motor and said switching means.

10. The invention according to claim 1 wherein said predetermined condition is one in which said first tuner is untuned to a signal within said first frequency band, said second tuner being in a condition when said first tuner is in said predetermined condition in which said second tuner is untuned to a signal within said second frequency band.

11. The invention according to claim 1 wherein said responsive means include DC potential source means for energizing said tuners, first and second switching means connected between said source means and respective ones of said tuners and means for simultaneously opening one and closing the other of said switching means and alternately simultaneously closing said one and opening said other switching means.

12. The invention according to claim 1 wherein said responsive means include a pulse source, means responsive to said first tuner being in said predetermined condition for rendering said pulse source operative to produce pulses and responsive to said first tuner being in any one of said plurality of conditions for rendering said pulse source inoperative to produce pulses and means responsive to said pulses for automatically, alternately energizing said first and second tuners cyclically each for predetermined periods of time.

13. The invention according to claim 1 wherein said responsive means include a pulse source, means responsive to said first tuner being in said predetermined condition for rendering said pulse source operative to produce pulses and responsive to said first tuner being in any one of said plurality of conditions for rendering said pulse source inoperative to produce pulses, DC potential source means for energizing said tuners, first and second switching means connected between said source means and respective ones of said tuners, and any one of the channel 2 to channel 13 positions, the VHF tuner, when energized, will be tuned to the signal for that particular channel. In addition, switch S2 is so coupled to shaft 12 that the switch remains closed when the VHF tuner is tuned to any one of channels 2 to 13. Under these circumstances capacitor C1 is short circuited and cannot charge via resistor R4. Consequently, there is no pulse output from network 28 and no switching of bistable multivibrator 29. With contacts 26 and 27 in their upper position, VHF tuner 10 will be energized, UHF tuner 11 will be de-energized and VHF tuner 10 will be tuned to one of channels 2 to 13. However, when VHF tuner 10 is moved to the channel 1 position, switch S2 opens permitting capacitor C1 to charge via resistor R4. When the voltage on capacitor C1 reaches a predetermined magnitude, unijunction transistor TR2 will fire delivering a pulse to input terminal 31 of bistable multivibrator 29. The frequency of these pulses is determined by the time constant of the network consisting of resistor R4 and capacitor C1. Multivibrator 29 functions in a well known manner to produce pulses of a duration that is determined by the frequency of the trigger pulse output of network 28. The output pulses of bistable multivibrator network 29 are supplied to the base electrode of transistor TR1 and alternately turn this transistor on and off in a cyclic manner. When transistor TR1 is on, current flows through relay coil RL1 and causes contacts 26 and 27 to change position, this change in position being repeated each time that the transistor turns on and current flows through coil RL1. When VHF tuner 10 was tuned to any one of channels 2 to 13 and energized, contacts 26 and 27 were in their upper position. The result of moving tuner 10 to the channel 1 position is to open switch S2 and turn on transistor TR1 in the manner previously described. This has the effect of moving moveable contacts 26 and 27 to their lower position to energize UHF tuner 11 and de-energize VHF tuner 10. Contacts 26 and 27 will remain in this position, assuming that switch S2 remains open, until transistor TR1 is turned on again, at which point contacts 26 and 27 will move to their upper position de-energizing UHF tuner 11 and energizing VHF tuner 10. This procedure will be repeated cyclically with the tuners automatically being alternately energized until such time as VHF tuner 10 is moved from the channel 1 position to any other position which, of course, has the effect of closing switch S2 and disabling trigger pulse producing network 28. Whichever tuner is energized at the time that VHF tuner 10 is moved from its channel 1 position to another position is the tuner which will remain energized until such time as VHF tuner 10 is moved back to the channel 1 position. The period of time that the tuners remain energized should be sufficiently long that the viewer can decide whether he wishes to tune to a VHF channel or a UHF channel. A satisfactory period of time is 5 seconds.

In order to indicate to the viewer which of the tuners is energized, the circuitry shown in the lower part of FIG. 1 is used in conjunction with, for example, a rotating disc (not shown) driven by drive shaft 12 and on which is indicated in two circular or arcuate rows the various channels to which VHF tuner 10 and UHF tuner 11 may be tuned. Located behind the row of numerals indicating the UHF channels is a light bulb 32, while a light bulb 33 is located behind the disc adjacent the row of numerals indicating the numbers of the channels to which VHF tuner 10 can be tuned. Light bulb 32 is connected between ground and the cathode of a silicon controlled rectifier SCR1, the anode of silicon controlled rectifier SCR1 being connected to a suitable source of AC potential at, say, 6.3 volts. This same source of AC potential is connected to the anode of a silicon controlled rectifier SCR2 that has lamp 33 connected in circuit therewith between its cathode and ground.

Fixed contact 22 is connected via a voltage divider network consisting of resistors R5 and R6 to the gate electrode of silicon controlled rectifier SCR1. Fixed contact 24 similarly is connected via a voltage divider network consisting of resistors R7 and R8 to the gate electrode of silicon controlled rectifier SCR2. With no trigger potentials applied to the gate electrodes of the silicon controlled rectifiers, no conduction of the silicon controlled rectifiers is permitted and so lamps 32 and 33 remain unilluminated. However, when UHF tuner 11 is energized by moveable contact 26 bridging fixed contacts 21 and 22, a trigger potential is applied to the gate electrode of silicon controlled rectifier SCR1 causing this rectifier to fire and lamp 32 to illuminate, thereby indicating that the UHF tuner is energized and, when the tuner is tuned indicating the channel to which the UHF tuner is tuned. Similarly, when VHF tuner 10 is energized by moveable contact 27 bridging fixed contacts 24 and 25, a trigger potential is applied to the gate of silicon controlled rectifier SCR2 causing it to fire and lamp 33 to be illuminated, thereby indicating that the VHF tuner is energized and, when the tuner is tuned, also indicating to which channel the VHF tuner is tuned.

It should be understood that the automatic switching hereinbefore described pursuant to which one and then the other of the tuners is energized preferably should take place when the VHF tuner is on a channel for which no signal is broadcast. This is generally the case with channel 1. If it were otherwise, and the switching back and forth took place when the VHF tuner was tuned to a channel on which a signal was being received, it would be impossible for the viewer to view an uninterrupted program on this channel, because every 5 seconds the VHF tuner would be de-energized for a period of 5 seconds. Similarly it is desirable that a "blank" channel on UHF tuner 11 be selected as the channel at which the switching takes place. This "blank" channel is the one that is selected when rotary contact 14 engages disconnected terminal 19a.

When the VHF and UHF tuners 10 and 11 respectively are in their "blank" channel positions, the aforesaid disc that is rotated by drive shaft 12 will be in a position such that the lettering UHF, rather than a channel number, will be illuminated by bulb 32 when the UHF tuner is energized and the lettering VHF, rather than a channel number, will be illuminated when bulb 33 is energized.

The receiver of FIG. 1 can be very conveniently remotely controlled using conventional remote control systems. Command signals generated by remote control transmitter 18 are received by receiver 17 which controls motor control network 16. This network in turn causes motor 13 to step in one direction or the other effecting simultaneous rotation of the turret of turret tuner 10 and of rotary contact 14. When VHF tuner 10 assumes the channel 1 condition, the hereinbefore described alternate switching to alternately enmeans responsive to said pulses for simultaneously opening one and closing the other of said switching means and alternately simultaneously closing said one and opening said other switching means.

14. The invention according to claim 13 wherein said predetermined condition is one in which said first tuner is untuned to a signal within said first frequency band, said second tuner being in a condition when said first tuner is in said predetermined condition in which said second tuner is untuned to a signal within said second frequency band.

15. The invention according to claim 14 wherein said rendering means include a motor and a remote control system for controlling the operation of said motor, said signal receiver being a television receiver and said tuners being UHF and VHF tuners.

* * * * *